(12) United States Patent
Kwan et al.

(10) Patent No.: US 7,593,329 B2
(45) Date of Patent: Sep. 22, 2009

(54) SERVICE AWARE FLOW CONTROL

(75) Inventors: Bruce H. Kwan, Sunnyvale, CA (US); Eugene N. Opsasnick, Cupertino, CA (US); Puneet Agarwal, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 603 days.

(21) Appl. No.: 11/260,232

(22) Filed: Oct. 28, 2005

(65) Prior Publication Data

US 2006/0092845 A1 May 4, 2006

Related U.S. Application Data

(60) Provisional application No. 60/709,097, filed on Aug. 18, 2005, provisional application No. 60/622,790, filed on Oct. 29, 2004.

(51) Int. Cl.
*H04L 1/00* (2006.01)
(52) U.S. Cl. ......................... 370/230; 370/412; 370/428
(58) Field of Classification Search ......... 370/229–235, 370/252–253, 412–418, 428–429
See application file for complete search history.

(56) References Cited

U.S. PATENT DOCUMENTS

| | | | |
|---|---|---|---|
| 5,179,556 A | 1/1993 | Turner | |
| 5,541,912 A | 7/1996 | Choudhury et al. | |
| 5,790,615 A | 8/1998 | Beale et al. | |
| 6,430,153 B1 | 8/2002 | Hughes et al. | |
| 6,456,590 B1 | 9/2002 | Ren et al. | |
| 7,161,901 B2* | 1/2007 | Vu | 370/229 |
| 7,272,672 B1 | 9/2007 | Swenson et al. | |
| 2002/0167950 A1 | 11/2002 | Chang et al. | |
| 2003/0123393 A1* | 7/2003 | Feuerstraeter et al. | 370/235 |
| 2003/0202525 A1* | 10/2003 | Nagatomo | 370/411 |
| 2004/0004975 A1 | 1/2004 | Shin et al. | |
| 2004/0042477 A1 | 3/2004 | Bitar et al. | |
| 2004/0109412 A1 | 6/2004 | Hansson et al. | |
| 2004/0114583 A1* | 6/2004 | Cetin et al. | 370/230.1 |
| 2006/0039400 A1 | 2/2006 | Mukhopadhyay et al. | |
| 2008/0212472 A1* | 9/2008 | Musacchio et al. | 370/232 |

OTHER PUBLICATIONS

Hazarika, A. et al., "Why Priority/Class Based Pause is Required?", P802.3ar Congestion Management, pp. 1-10, Jul. 2005.

(Continued)

*Primary Examiner*—Ricky Ngo
*Assistant Examiner*—Pao Sinkantarakorn

(57) ABSTRACT

A service aware flow control apparatus and method for multiple classes of data packets. A flow control sender includes a buffer of an ingress port per Class Group or Class of Service (COS). A counter per COS tracks an amount of buffer utilization per ingress port per COS, and each counter comprises an XOFF threshold level of congestion and an XON threshold. A controller detects, during transmission of the data packets, a counter associated with a buffer for a particular COS has risen to be greater than or equal to the XOFF threshold level of congestion. A flow control receiver ceases transmission of the data packets to the buffer for the particular COS experiencing congestion and allowing transmission of the data packets corresponding to other COS in the flow control sender.

17 Claims, 12 Drawing Sheets

OTHER PUBLICATIONS

Ayandeh, S. et al., "IEEE 802.3 Flow Control Baseline Requirements", IEEE 802.3 CMSG,(Jul. 12, 2004),pp. 1-11.

Finn, N "Vlans, Classes of Serrvice, and Flows", IEEE 802.3 CMSG, (Jul. 2004), pp.1-19.

Merchant, S. "Class based Flow Control, A Necessary Requirement For Congestion Management", IEEE_Preso, (Jul. 19, 2005), pp. 1-10.

Choudhury, et al., "Dynamic Queue Length Thresholds for Shared-Memory Packet Switches", (Apr. 1998), pp. 130-140.

Hahne, E. L., et al., "Dynamic Queue Length Thresholds for Multiple Loss Priorities", IEEE/ACM Transactions on Networking, vol. 10, No. 3,, (Jun. 2002), pp. 368-380.

"Non-Final Office Action received for U.S. Appl. No. 11/260,269, mailed on Oct. 2, 2008", 40 pages.

Asif Hazarika, et al., "Why Priority/Class Based PAUSE is Required?," P802.3ar Congestion Management, pp. 1-10, Jul. 2005.

Siamack Ayandeh, et al., "IEEE 802.3 Flow Control Baseline Requirements," Jul. 12, 2004, IEEE 802.3 CMSG, pp. 1-11.

Noman Finn, "VLANs, Classes of Service, and Flows," Jul . 2004, IEEE 802.3 CM SG, pp. 1-19.

Shashank Merchant, "Class Based Flow Control A Necessary Requirement for Congestion Management," Jul. 19, 2005, IEEE_Preso, pp. 1-10.

Office Action mailed on May 14, 2009, for U.S. Appl. No. 11/260,269.

* cited by examiner

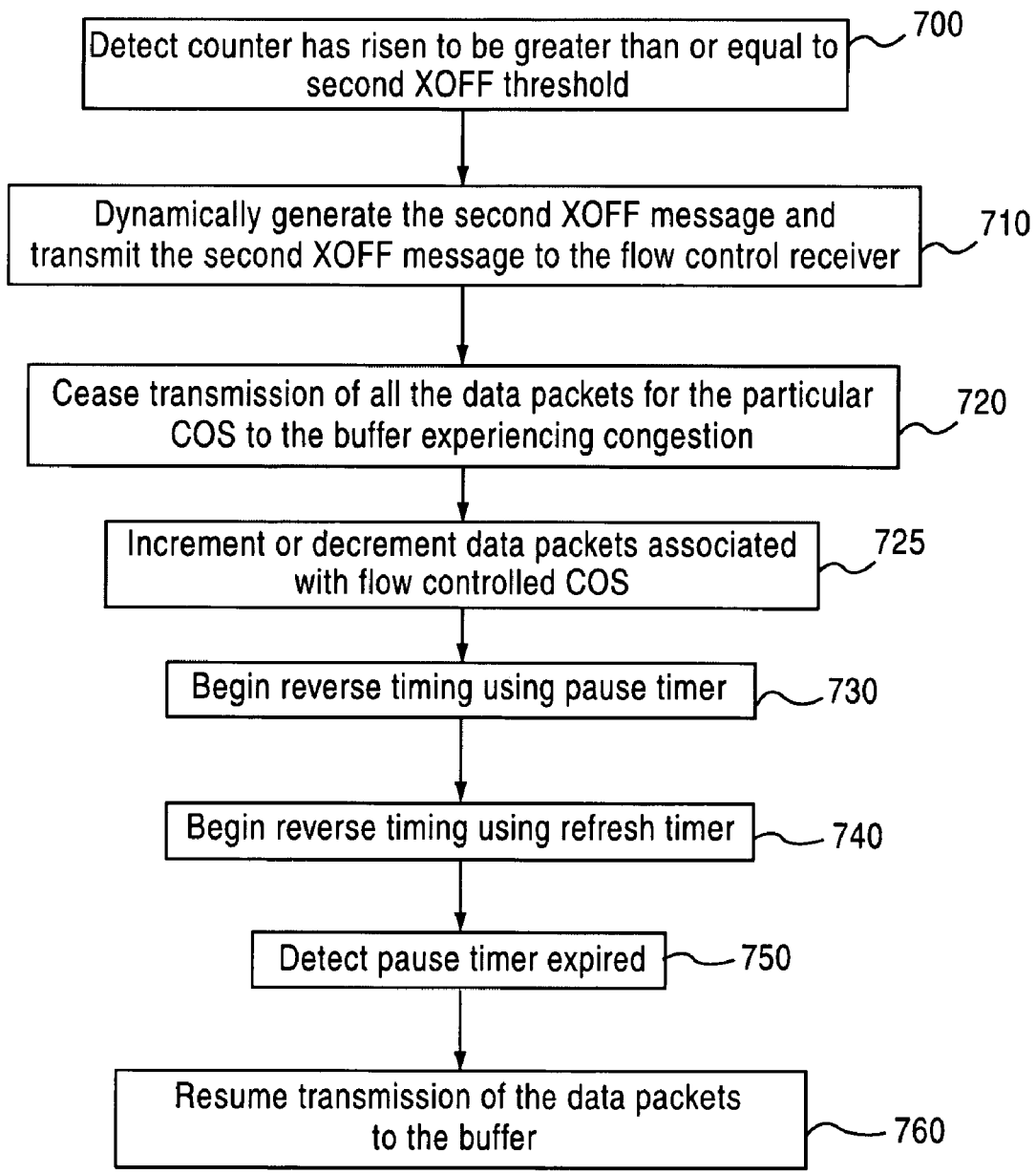

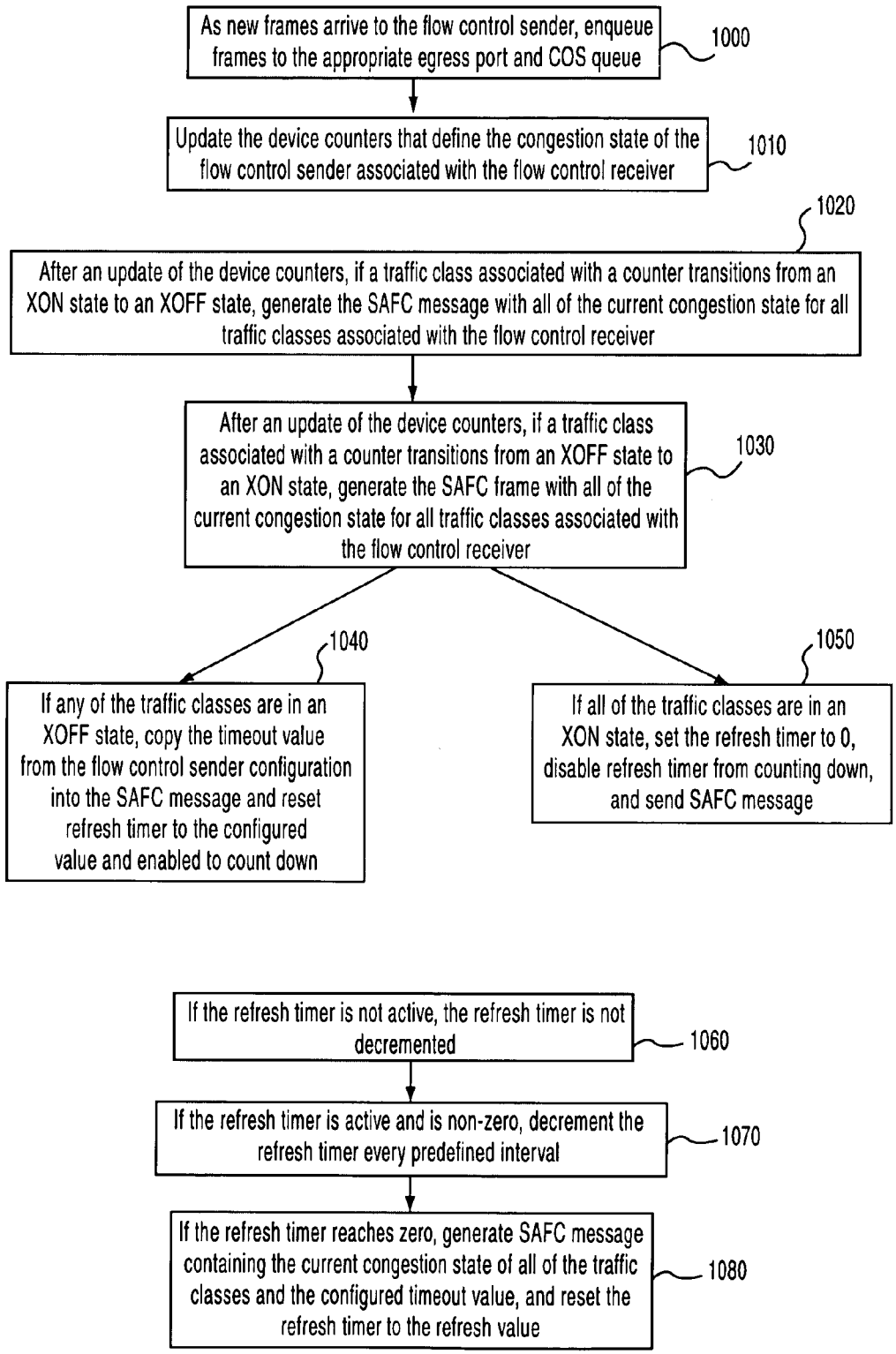

SERVICE AWARE FLOW CONTROL

REFERENCE TO RELATED APPLICATIONS

This application claims priority of U.S. Provisional Patent Application Ser. No. 60/709,097, filed Aug. 18, 2005, and U.S. Provisional Patent Application Ser. No. 60/622,790, filed Oct. 29, 2004. The subject matter of this earlier filed application is hereby incorporated by reference.

BACKGROUND OF THE INVENTION

1. Field of the Invention

The invention is related to a system and method to enable a reactive flow control scheme that provides lossless packet delivery for multiple classes of traffic across a common physical link between link partners to optimize throughput performance and enable differentiated packet delivery for switch devices that offer link level flow control support.

2. Description of the Related Art

With transmission of data over a digital communication network, such as an asynchronous transfer mode or ATM network, problems arise when multiple sources send data cells or packets at widely varying rates through a switch node or link of the network at an aggregated rate which taxes the ability of the switch node or link to handle the data. Congestion occurs at the node of a network when data arrives at the node at a rate exceeding the rate at which the node can process and forward the data to other nodes. The excess data then accumulates in buffer storage at the node, which fills at a rate which is the difference between the arrival rate and the processing and forwarding rate. If the congestion persists for a long period of time, the buffer storage will be filled to maximum capacity and any additional data must be discarded.

In an effort to minimize such data loss, different types of flow control systems have been proposed. One such system for lossless data packet delivery for multiple classes of traffic between sources and receivers includes a link level flow control scheme (XON/XOFF) and is used in Ethernet line services. However, a granularity of this scheme is on a per port basis, which leads to a PAUSE of both high and low priority traffic. Specifically, IEEE 802.3 defines a Link Level PAUSE (LLP) flow control scheme as a solution to guarantee lossless behavior over a point to point link. The main issue with the LLP is that once the LLP is triggered, all the traffic from a source or a sender is stopped. As a result, delay sensitive traffic is also stopped, thereby leading to unpredictable delays. Further, typically the LLP is initiated because of highly bursty Best Effort traffic due to the nature of LLP, thereby mostly affecting the high priority delay sensitive traffic.

PAUSE is typically used to insure that the high priority traffic is not dropped (as well as to insure low latency) as it traverses various links, but the primary traffic that triggers LLP is the highly bursty Best Effort (which itself does not require low latency and lossless guarantees).

BRIEF DESCRIPTION OF THE DRAWINGS

Further embodiments, details, advantages and modifications of the present invention will become apparent from the following detailed description of the preferred embodiments which is to be taken in conjunction with the accompanying drawings, in which:

FIGS. 7A and 7B illustrate the SAFC method using two XOFF thresholds, in accordance with an embodiment of the present invention;

FIG. 10 illustrates the SAFC method performed at the flow control sender, in accordance with an embodiment of the present invention.

DETAILED DESCRIPTION OF THE PREFERRED EMBODIMENTS

Figure 1:
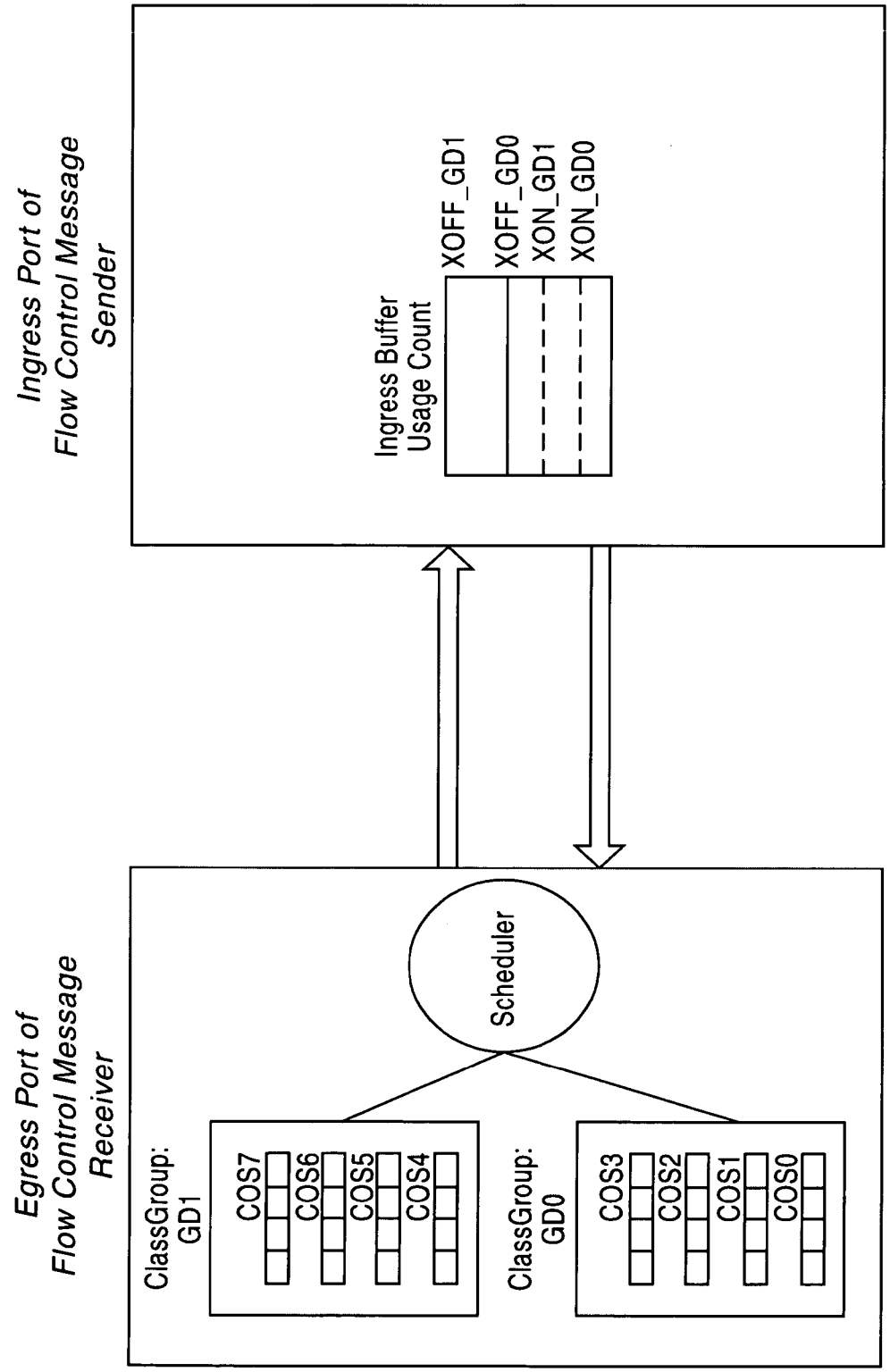
FIG. 1 illustrates an accounting at an ingress port at an COS granularity, in accordance with an embodiment of the present invention.

Reference will now be made in detail to the present preferred embodiments of the present invention, examples of which are illustrated in the accompanying drawings, wherein like reference refers to the like elements throughout.

According to an embodiment of the present invention, a service aware flow control (SAFC) system and method for a link level flow control scheme for data traffic in a communications network are provided, which take into account a service requirement of a delay sensitive and lossless nature of high priority data by keeping separate accounting at an ingress port per Class Group or per Class of Service (COS) and by providing that lossless delay sensitive high priority traffic may trigger flow control. Best effort traffic (i.e., low priority traffic) may be separately flow controlled at the discretion of user settings, thereby maintaining the high priority traffic on the link as long as possible. Any further best effort packets may be dropped at the ingress port in favor of the high priority traffic if the link partner does not respond to the flow control request. This use case is one example among a number of possible use cases. Thus, SAFC is a reactive link level flow control mechanism that supports the starting and stopping of traffic on a COS level granularity. The SAFC mechanism is to be supported in any packet switched network of devices, including Ethernet.

A Class Group is a grouping of COS queues. The goal of the Class Group concept is to enable coarse-grained link level flow control across more fine-grained queuing structures. This Class Group idea allows for support of the Service Aware Flow Control mechanism in devices with constrained buffering resources. Two frame delivery services are defined, Guaranteed Delivery (GD) and Best Throughput (BT). Guaranteed Delivery is defined as a frame delivery service that ensures lossless frame delivery between two link partners. Best Throughput is defined as a frame delivery service that does not guarantee lossless frame delivery. When subscribing to the BT service, frames may be dropped. Service Aware Flow Control may be used to enable Guaranteed Delivery (GD) service for specific classes of service.

The SAFC mechanism is capable of operating in conjunction with methods that support adaptive dynamic thresholding mechanisms that may be used to enable more efficient buffer utilization.

To provide lossless performance, flow control is required. In the SAFC scheme, flow control is based on ingress accounting of buffering resources. As a result of the low supply of available buffers at an ingress port, when congestion is determined at an ingress port, the ingress port will stop, pause, or drop the best effort traffic. If a buffer supply goes even lower, then and only then a PAUSE signal may be triggered for the high priority traffic. Thus, a proper tuning of various flow control and timing thresholds and providing a counter per COS at the ingress port effectively ensures that the high priority traffic can keep flowing on the front panel Ethernet link even under congestion scenarios, though at the expense of best effort traffic. By tuning the various flow control thresholds, the SAFC system and method of the present invention ensures that high priority traffic keeps flowing. SAFC defines a mechanism that provides lossless guarantees while maximizing throughput, all with limited buffering. SAFC takes into account the service requirements of delay sensitive traffic and enables a system to contain the behavior of different traffic types. Specifically, SAFC enables selective link level flow control of Class of Service queues between link partners.

The SAFC mechanism of the present invention provides lossless packet delivery for multiple classes of traffic across a common physical link between link partners. The SAFC mechanism applies to both Ethernet networks as well as any other packet switching network.

The triggering mechanism for the SAFC mechanism is reactive based on present resource allocation state. The ingress processing involves tracking of buffering resources based on ingress port utilization. When resources become scarce, flow control is initiated by an ingress port of a flow control message sender of an ingress port to a flow control message receiver of an egress port, instructing the flow control message receiver to cease transmission of the packets associated with a particular COS. The flow control sender may be a destination endpoint or a data receiver. The flow control receiver may be a source endpoint or a data sender.

In accordance with an embodiment of the present invention, low loss, low latency traffic may be allowed to flow across the link without triggering flow control due to the bursty best effort traffic. Only in the event that the low loss, low latency traffic itself uses up too many resources will that particular class of traffic be flow controlled (assuming flow control support is required for low latency traffic). Thus, in accordance with an embodiment of the present invention, the SAFC mechanism is provided allowing the switch to pause one particular COS experiencing congestion over another by providing a counter per COS, thereby keeping separate accounting at the ingress port per COS. That is, instead of managing each data packet flow at the ingress ports the same, the SAFC mechanism processes each data packet per COS based on ingress port buffer utilization. The present invention may support any number of classes of service, for instance, data, voice, text, etc.

FIG. 1 illustrates an accounting at an ingress port at a Class Group granularity matching a granularity at which an egress port scheduler may flow control traffic. The scheduler is responsible for scheduling access to the port bandwidth at the granularity of the COS queues while paying attention to a flow control state which affects the COS queues at the coarse-grained CG (Class Group) level. A specific Class of Service Identifier (COS ID #) is assigned to each data packet. The COS ID is used to aid in managing an accounting of buffer resources and to also identify the correct queue to utilize at a specific egress port. The following attributes may apply to the COS IDs: COS IDs are numbered COS0-COS7, and an implicit priority associated with the COS identifier is that COS7 is the highest priority and COS0 is a lowest priority. Associated with every COS ID is a frame delivery service, either Guaranteed Delivery (GD) or Best Throughput (BT).

For illustrative purposes, two Class Groups may be defined to each include 4 COS ID's. Class Group GD1 contains COS ID's COS4-COS7 while Class Group GD0 contains COS ID's COS0-COS3. The Class Groups are used to collapse these COS ID's so that the flow control mechanism may operate across the 8 COS ID's using only 2 types of flow control events, one for Class Group GD0 and one for both Class Groups GD1 and GD0.

At the egress port side of a flow control message receiver, a set of COS queues (one COS queue for every COS ID) is grouped according to Class Groups. At the ingress port side of a flow control message sender of FIG. 1, an ingress port counter is used to track ingress port utilization for each Class Group. Flow control events are triggered according to the aggregate COS granularity (Class Group) and are used to stop and start traffic as classified for each Class Group.

To allow all the guarantees to make sense with the limited on-chip buffer memory, eight input priorities per port may be grouped such that some of the guarantees and thresholds will be applied to a group consisting of one or more COS priorities. Fewer separate Class Groups (CG) per input port may be implemented (less than the total number of supported COS). Each of the eight individual COS priorities levels may be flexibly mapped to one of these groups. The characteristics for each CG may include the following: each input port supports the class groups, each input priority value may map to one of the Class Groups, the Class Groups may have an implied priority (higher numbered CG's may have higher priority than lower numbered CG's), each Class Group may be configured as guaranteed delivery (GD) which is lossless or best throughput (BT) which is not lossless, each Class Group may be programmed with a guaranteed minimum buffer space, each Class Group may be programmed with a guaranteed headroom buffer space, each GD (lossless) Class Group may have a guaranteed headroom reserved equal to the worst-case RTT, and each Class Group may have an XOFF/XON threshold for flow control which affects all individual priorities assigned to the group.

Figure 2:
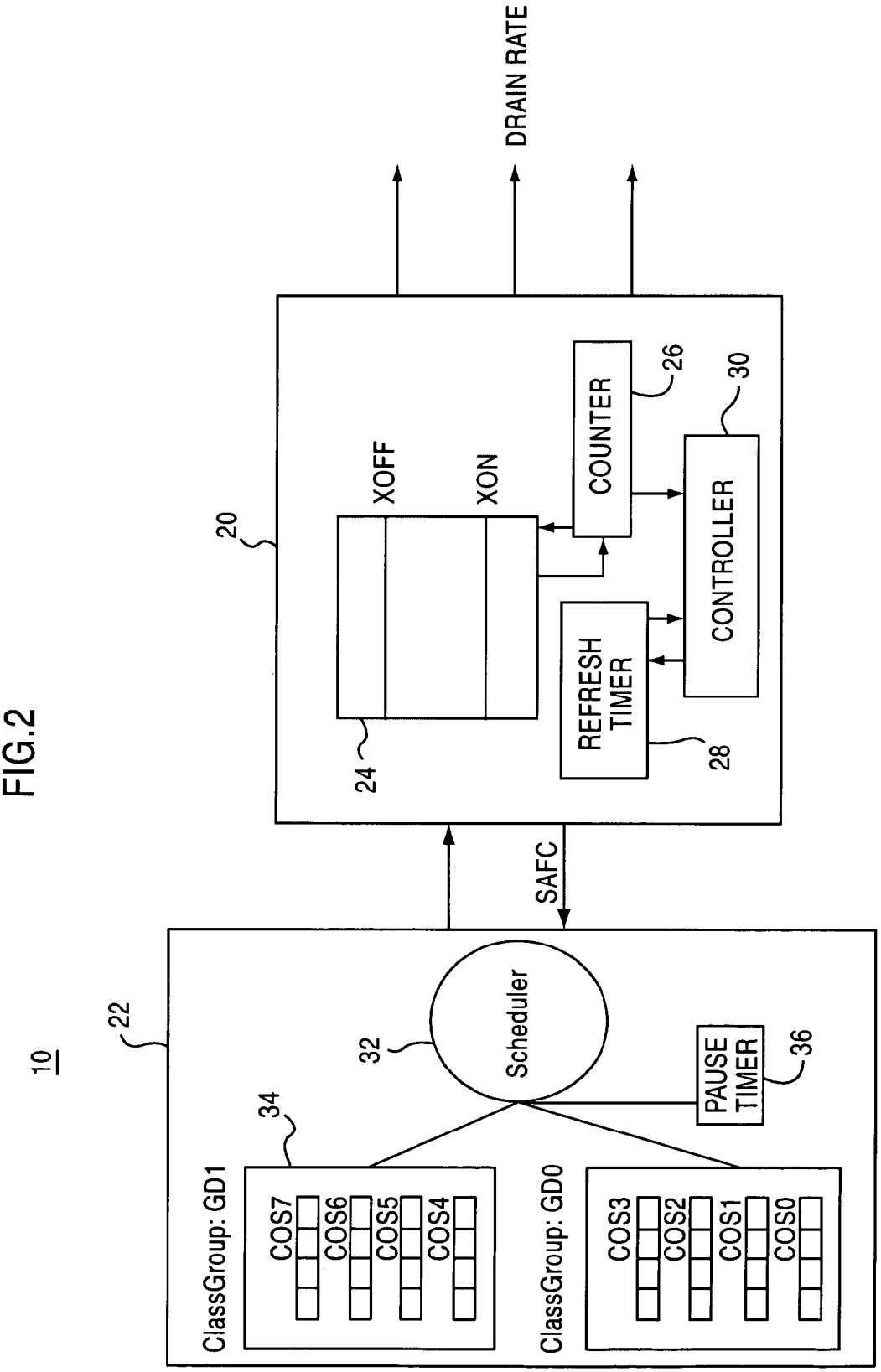
FIG. 2 illustrates a service aware flow control (SAFC) system, in accordance with an embodiment of the present invention.

FIG. 2 illustrates the dynamically triggered SAFC system between at least one flow control sender 20 and at least one flow control receiver 22, in accordance with an embodiment of the present invention. A person of ordinary skill in the art will appreciate that the SAFC system of the present invention may be applied to any flow control receiver/flow control sender configuration, not limited to a fabric or switch environment. The ingress port of the flow control sender 20 includes a buffer 24 per COS to which data packets are stored and retrieved, where the buffer 24 is operatively connected to a counter 26 and a refresh timer 28. The flow control sender 20 of the present invention may include N number of counters per ingress port, where each counter 26 is tracking an amount of buffer utilization per ingress port per COS (or CG). Specifically, the counter 26 incrementally counts when a data packet is received at the buffer 24 and decrements when the data packet is output from the buffer 24. N may be less than or equal to the number of COS per ingress port depending on whether or not Class Groups are utilized. N may also be equal to 1 when multiple XOFF thresholds are supported (to be later described). Although FIG. 2 illustrates one refresh timer 28, a person of ordinary skill in the art will appreciate that multiple refresh timers may be provided.

Buffer utilization may be measured with respect to at least one XON threshold and at least one XOFF threshold. A drain rate of the ingress buffer 24 may vary over time. The XOFF threshold may be a function of an available buffering remaining in the ingress port, which is measured using the counter 26. The XOFF threshold may be fixed based on the worst case requirement of an amount of buffering that must occur following a creation of an XOFF message. Consequently, XOFF may be dependent upon a state of a reserved pool of available buffers 24. In one embodiment, one XOFF threshold may be set up such that a lowest COS is only allowed to consume up to a first XOFF threshold as compared against a single counter tracking buffer utilization before flow control (i.e., a first XOFF message) is triggered for that COS. The higher COS may be allowed to consume up to a second XOFF threshold as compared against a single counter tracking buffer utilization before flow control (i.e., a second XOFF message) is triggered for that COS. The buffer usage may be tracked by the counter 26 associated with the particular buffer 24.

In turn, an XON threshold in the buffer 24 is driven by the goal of avoiding underutilzation in the SAFC system. Consequently, the XON threshold is a function of the used buffering in the SAFC system for each ingress port. Accordingly, the flow control sender 20 may set the XON threshold in such a way that the time required to deplete its buffer 24 is larger than the time required to send an XON message to the flow control receiver 22, and for the flow control receiver 22 to successfully restart the data transmission packet flow towards flow control sender 20. Thus, egress port resources at the flow control receiver 22 are not underutilized.

A controller 30 is operatively connected to the refresh timer 28 and the counter 26 and at least monitors and controls the congestion at the ingress buffer 24 of the flow control sender 20. Although FIG. 2 illustrates one ingress counter 26 operatively connected to the ingress buffer 24, a person of ordinary skill in the art will appreciate that multiple counters per COS may be illustrated. Accordingly, the controller 30 may monitor and control congestion at multiple ingress buffers.

The egress port of the flow control receiver 22 includes the scheduler 32 and at least one Class Group 34 as described in FIG. 1. Also, the flow control receiver 22 includes a pause timer 36 (to be later described), in accordance with an embodiment of the present invention. Although FIG. 2 illustrates one pause timer 36, a person of ordinary skill in the art will appreciate that multiple pause timers may be provided.

An SAFC message is a data flow control frame exchanged between the flow control sender 20 and the flow control receiver 22. The SAFC message may include a priority bitmap, which specifies the current XON/XOFF state of the 8 priorities, for instance, associated with the link partner. A '0' indicates that the traffic of a particular priority is in an XON state and a '1' indicates the priority is in an XOFF state. For purposes of brevity, when the SAFC message includes the bitmap for a particular priority of '0', the SAFC message will be referred to as an XOFF message, indicative of a need to pause (i.e., maintain an XOFF state) transmission of a data packet for that particular priority. In turn, when the SAFC message includes the bitmap for a particular priority of '1', the SAFC message will be referred to as an XON message, indicative of allowed (i.e., maintain an XON state) transmission of a data packet for that particular priority. In a single SAFC message, multiple bits in the bitmap may be set and it depends on the current state of the counters associated with the flow control sender. In an alternate embodiment, the SAFC message may include a variable number of field pairs. This format is aimed at enabling the support of multiple refresh timers and multiple pause timers. The first field of the message would be a length field that identifies the number of field pairs that follow. Each field pair contains a COS number and a timer value. The timer value would be the indicator of whether the action for the associated COS should be an XON or and XOFF. When the timer value is set to '0', the action associated with the COS would be an XON. When the timer value is set to a non-zero value, the action associated with the COS would be an XOFF for the time specified in the timer value field. This timer value may be stored in 16 bits in units of pause_quanta which is equal to 512 bit times of a particular implementation.

The SAFC message that supports a bitmap may also include a timeout value, which is a value used by the flow control receiver 20 to set the pause timer 36, which is used to limit the amount of time that the XOFF event is in effect. This timeout value applies to those priorities that are specified to be in an XOFF state in a Priority Bitmap, which may be stored in 16 bits in units of pause_quanta which is equal to 512 bit times of a particular implementation. In one instance, a range of possible pause_time is 1 to 65535 pause_quanta.

Thus, the flow control receiver 22 may receive an XOFF message for a particular COS. The XOFF message affects the flow control receiver egress port's scheduler 32 such that the specified COS is no longer scheduled for service until the XON message is received for the flow controlled COS or until the pause timer expires. It is assumed that the flow control receiver 22 will be able to act upon a bitmap specifying the set of COS that requires flow control.

Congestion may be detected when the counter 26 reaches the XOFF threshold. Upon reaching the XOFF threshold, the counter 26 triggers an XOFF signal to be sent by the controller 30. The controller 30 sends the XOFF message to the flow control receiver 22 identifying a current state of a particular buffer 24 of the ingress port for a particular COS, such as an XOFF state. The XOFF state occurs when the controller 30 determines that the counter 26 of a particular COS rises above the XOFF threshold. After entering the XOFF state, the XON state occurs when the controller 30 determines that the counter 26 for the flow control sender 20 of the ingress port falls below the XON threshold. At this point, the controller 30 sends the XON message to the flow control receiver 22 identifying a current XON state of a particular buffer 24 of the ingress port for a particular COS, thereby allowing the flow control receiver 22 to further transmit the data packets to the buffer 24 of the flow control sender 20. The flow control sender 20 may use a bitmap to flow control a set of COS. Another implementation would be to only specify the highest COS being flow controlled and then the flow control receiver 22 would need to stop that COS and the COS below it. Another implementation would be to specify each COS with a separate timeout value using field pairs.

When an XOFF condition lasts for a duration longer than specified in the SAFC message, the flow control state may be "refreshed" by the flow control sender. Accordingly, the refresh timer 28 of the flow control sender 20 "refreshes" the current state of its flow control only when the buffer 24 is in an XOFF state. When buffer 24 is not in an XOFF state, no "refreshes" of the current state of its flow control are sent. The refresh timer 28 is used to determine when the flow control sender 20 must refresh the flow control state. The refresh timer 28 is user configurable and, in accordance with an embodiment of the present invention, has a value set to be less than the timeout value of the pause timer 36. When the refresh timer 28 expires, the flow control sender 20 refreshes the flow control state of the priorities to the link partner (i.e., the flow control receiver 22). Thus, the refresh timer 28 would time a refresh time period defined as a time in which the congestion at the buffer 24 for the particular COS of the ingress port experiencing congestion is expected to be resolved. Although only one refresh timer 28 is referred to above, a person of ordinary skill in the art will appreciate that multiple refresh timers may be used to individually control refreshing of flow control state for specific COS.

In turn, the flow control receiver 22 includes N ports transmitting the data packets to the flow control sender 20, the scheduler 32, and the pause timer 36. When the XOFF message is sent to the flow control receiver 22, the controller 30 in the flow control sender 20 attaches to the XOFF message a timeout value defining a time period for the flow control receiver 22 to determine that the XOFF has expired.

Link errors may cause the XON message to become corrupted and lost. Without proper error management mechanisms, this may lead to deadlock conditions and very poor performance. The flow control receiver 22 supports the determination that the XOFF has expired by using the pause timer 36 that is set to the timeout value of the incoming XOFF message. The pause timer 36 would time from the timeout value down to 0. Upon reaching 0, the pause timer 36 would direct the flow control receiver 22 to resume transmission the data packets to the flow control sender 20, thereby assuming that the congestion at the particular ingress port in the flow control sender 20 has been resolved. Thus, the purpose of the pause timer 36 is to insure that the flow control receiver 22 never falls into a permanent XOFF state, which may occur if the XON message in the SAFC control frame or message is lost or corrupted. Although only one pause timer 36 is referred to above, a person of ordinary skill in the art will appreciate that multiple pause timers may be used to individually control expiration of flow control state for specific COS.

Thus, if an XON message is lost, the pause timer 36 in the flow control receiver 22 may expire and assumes an implicit XON message to resume scheduling of the COS queues. If the pause timer 36 counts down to 0 before receiving another XOFF control frame, all of the COS queues, affected by the pause timer, currently in a flow controlled state are released and allowed to resume transmission. Accordingly, transmission of the data packets from the flow control receiver 22 to the flow control sender 20 would occur either if the flow control sender 20 sends the XON message explicitly directing the flow control receiver 22 to resume the transmission or if the pause timer 36 expires.

In addition, multiple XOFF thresholds may be set up at the ingress buffer 24. In this instance, congestion would be determined at a particular buffer 24 of an ingress port at a ingress port level when the counter 26 has risen to be greater than or equal to a first XOFF threshold. Rather than immediately pausing or stopping further transmission of high priority data, the controller 30 would direct the flow control receiver 22 to pause or stop the best effort traffic only by outputting a first XOFF threshold signal to the flow control receiver 22. If the ingress port buffer counter of the particular ingress port rises to be greater than or equal to a second XOFF threshold, then and only then would the controller 30 trigger the PAUSE signal to the flow control receiver 22 to pause all data transmission, including the high priority data. The best effort traffic would not be allowed by the ingress buffer 24 until the buffer counter falls to be less than a specific XON threshold, that is, below at least the first XOFF threshold, to reduce the probability of frequent flow control events. To insure lossless frame delivery, a separate pool of buffers may be defined on a per COS granularity and would be used to absorb inflight data following the sending of an XOFF SAFC message. A separate set of counters may also be defined on a per COS granularity to account for utilization of these inflight frame buffers. The counters would be incremented following the transmission of the XOFF SAFC message whenever the flow control sender receives frames with a COS value that have been flow controlled. The counters would be decremented following the departure from the flow control sender of frames with a COS value that have been flow controlled.

Thus, the SAFC of the present invention takes into account a service requirement of a delay sensitive and lossless nature of high priority traffic by keeping separate accounting at the ingress port of the flow control sender 20 per COS or per ingress port only and by providing that only the lossless delay sensitive high priority traffic triggers flow control, and that best effort traffic (i.e., low priority traffic) can be dropped and optionally (separately) flow controlled at a discretion of user settings. Any further best effort packets would be dropped at the ingress in favor of the low loss, low latency traffic.

At present, PAUSE link level flow control in Ethernet is handled in the 802.3 domain. However, one of the many goals of SAFC is to enable the flow control of the Class of Service queues.

In accordance with an embodiment of the present invention, Ethernet SAFC may be implemented in the MAC or at the level where the 802.1p queues are implemented. If the pausing and resuming mechanism is only implemented above the MAC layer, the role of the MAC in SAFC is to simply convey the SAFC messaging to the location of where the pause and resume functions are implemented at the 802.1p queues.

Figure 3:
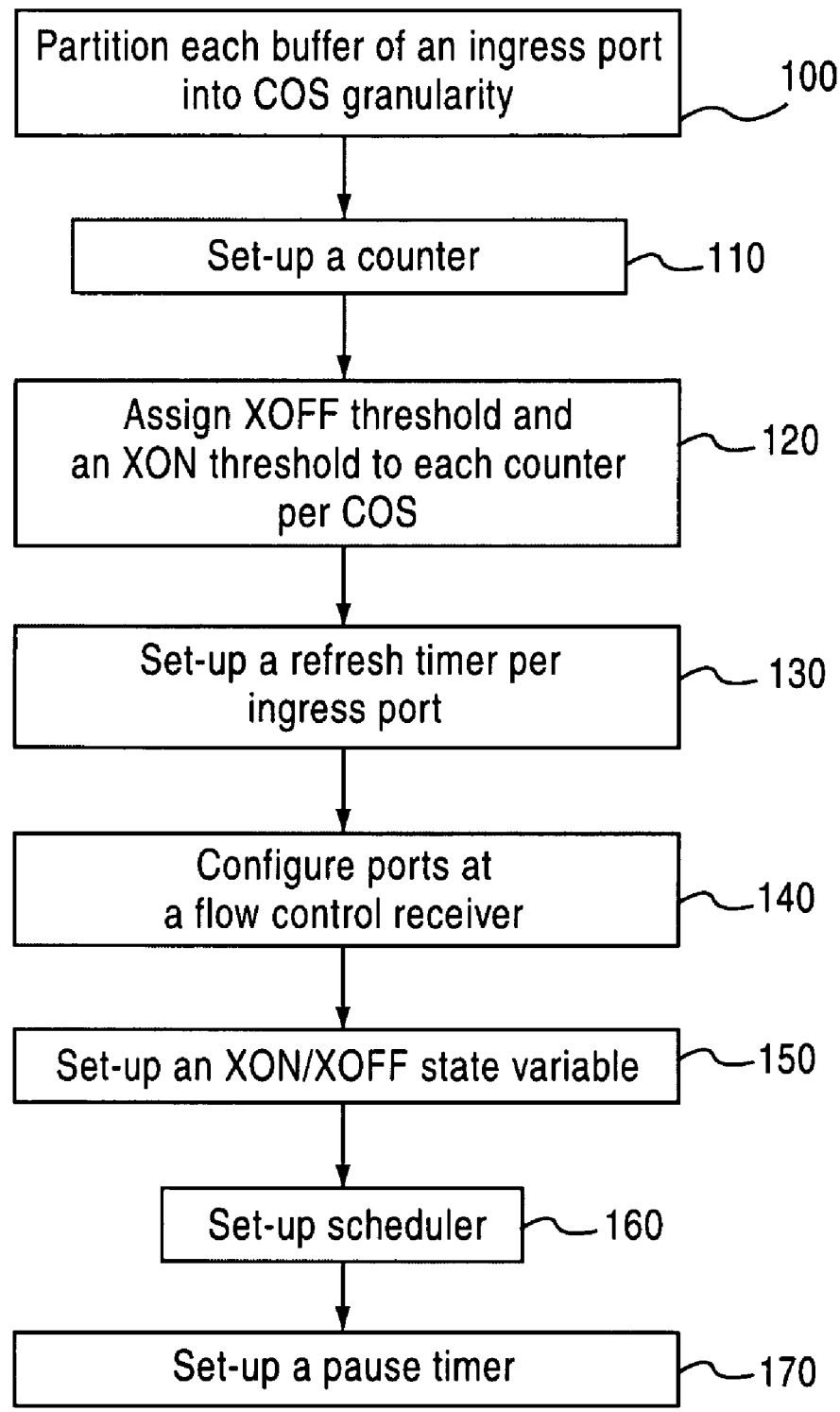
FIG. 3 illustrates a set-up method performed, in accordance with an embodiment of the present invention.

FIG. 3 illustrates a set-up method performed, in accordance with an embodiment of the present invention. At operation 100, the method partitions, at the flow control sender 20, each buffer 24 of an ingress port into a COS granularity. In an alternative embodiment, the method assigns a buffer of an ingress port per Class Group. In another alternative embodiment, the method assigns a buffer for the ingress port. At operation 110, the method assigns a counter 26 per ingress port per COS to track the corresponding buffer utilization. At operation 120, the method assigns at least one XOFF threshold and the XON threshold to each counter 26 per COS. At operation 130, the method sets-up the refresh timer 28 per ingress port. Operations 100 to 130 are performed at the flow control sender side 20. In an alternative embodiment, the counter 26 may be associated with the entire ingress port buffer.

At operation 140, the method configures same number of queues or ports at the flow control receiver 22 as the number of buffers in the ingress port of the flow control sender 20 at the COS granularity. At operation 150, the method sets up an XON/XOFF state variable indicating the flow control receiver 22 whether the buffer 24 of the ingress port per COS in the flow control sender 20 is in the XON state or XOFF state. At operation 160, the method sets-up the scheduler 32 so that transmission does not occur during the XOFF state. At operation 170, the method sets-up the pause timer 36 at the flow control receiver side. Operations 140 to 160 are performed at the flow control receiver side.

Figure 4:
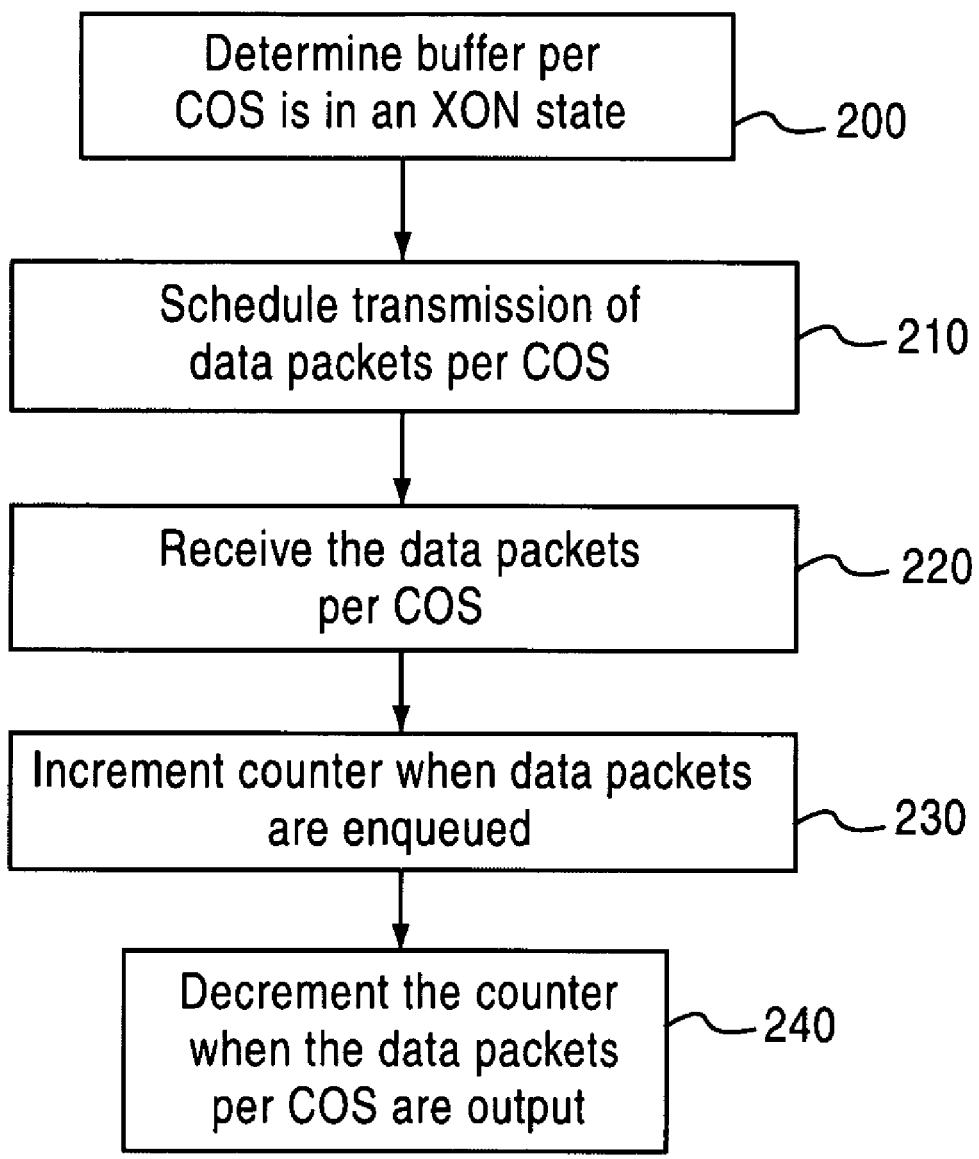
FIG. 4 illustrates a method performed during normal operation, with no congestion, between a flow control receiver and a flow control sender, in accordance with an embodiment of the present invention.

FIG. 4 illustrates a method performed during normal operation, with no congestion, between the flow control receiver 22 and the flow control sender 20, in accordance with an embodiment of the present invention. At operation 200, the method determines whether a particular buffer 24 per COS in the flow control receiver 22 is in the XON state. Accordingly, at operation 210, the scheduler 32 in the flow control receiver 22 schedules transmission of the data packets to the flow control sender 20. At operation 220, in the flow control sender 20 side, the buffer 24 or buffer partition associated with the particular COS receives the data packets corresponding to the same COS. There is an allowable amount of buffer utilization for the buffer 24 per COS. As the data packets are received, at operation 230, the counter 26 associated with the particular COS, begins incrementing or counting the number of enqueued packets. As the data packets associated with the particular COS are output or dequeued from the buffer 24, at operation 240, the counter 26 is decremented.

Figure 5:
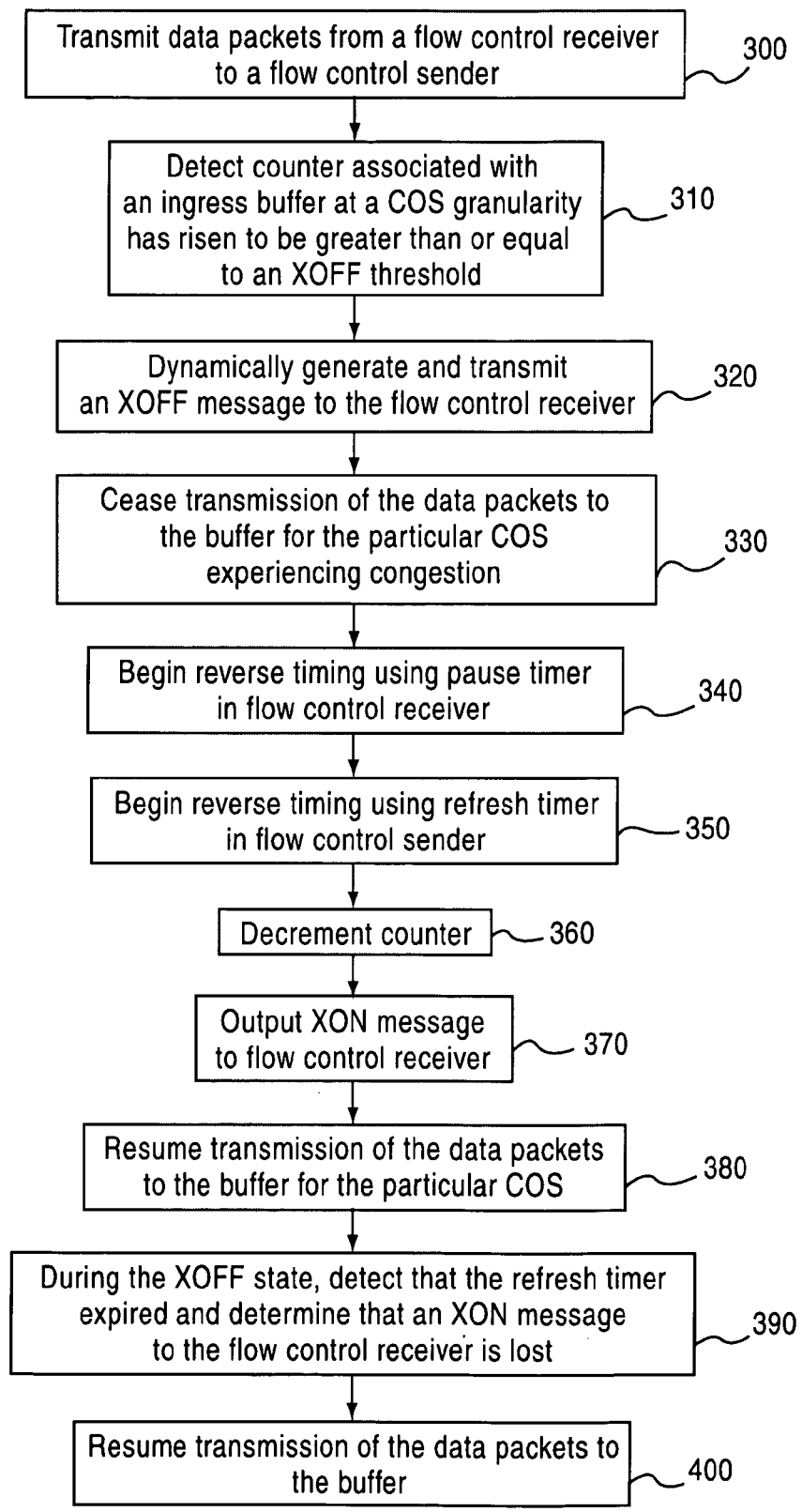
FIG. 5 illustrates a SAFC method, in accordance with an embodiment of the present invention.

FIG. 5 illustrates the SAFC method, in accordance with an embodiment of the present invention. At operation 300, the flow control receiver 22 transmits the data packets to the flow control sender 20. At operation 310, during transmission of the data packets between the flow control receiver 22 and the flow control sender 20, the controller 30 detects that the counter 26 associated with the buffer 24 of the ingress port at the COS granularity has risen to be greater than or equal to the XOFF threshold, thereby dynamically indicating that the buffer 24 for the particular COS may be operating in the XOFF state. At operation 320, the controller 30 dynamically generates the XOFF message associated with the particular ingress port and COS experiencing congestion and transmits the XOFF message to the flow control receiver 22. In response, at operation 330, the flow control receiver 22 ceases transmission of the data packets to the buffer 24 for the particular COS experiencing congestion (as indicated in the flow control message). At operation 340, the pause timer 36 of the flow control receiver 22 begins reverse timing from the timeout value specified in the XOFF message down to zero.

At operation 350, the refresh timer 28 begins reverse timing from the refresh time value down to zero. At operation 360, as a result of ceasing transmission of the data packets, the buffer 24 continues to output the data packets previously in the buffer queue and the counter 26 progressively decrements. At operation 370, if the counter 26 reaches the XON threshold, the flow control sender 20 outputs the XON message to the flow control receiver 22 indicative that the congestion detected at the buffer 24 of the ingress port for the particular COS has been resolved. At operation 380, the flow control receiver 22 resumes transmission of the data packets to the buffer 24 for the particular COS.

If during the XOFF state, the pause timer 36 at the flow control receiver 22 expires, at operation 390, the method determines that link errors may have caused the XON message to the flow control receiver 22 to become corrupted or lost. At operation 400, method directs the flow control receiver 22 to resume transmission of the data packets to the buffer 24. If the method determines that the buffer 24 associated with the ingress port at the COS granularity is still congested and that the counter 26 is at or above the XOFF threshold, thereby operating in the XOFF state, the method would return to operation 320, where the flow control sender 20 would generate and transmit another XOFF message to the flow control receiver 22.

Although operations 320 to 360 are described in sequential order, a person of ordinary skill in the art will appreciate that the operations may be performed in parallel.

Figure 6:
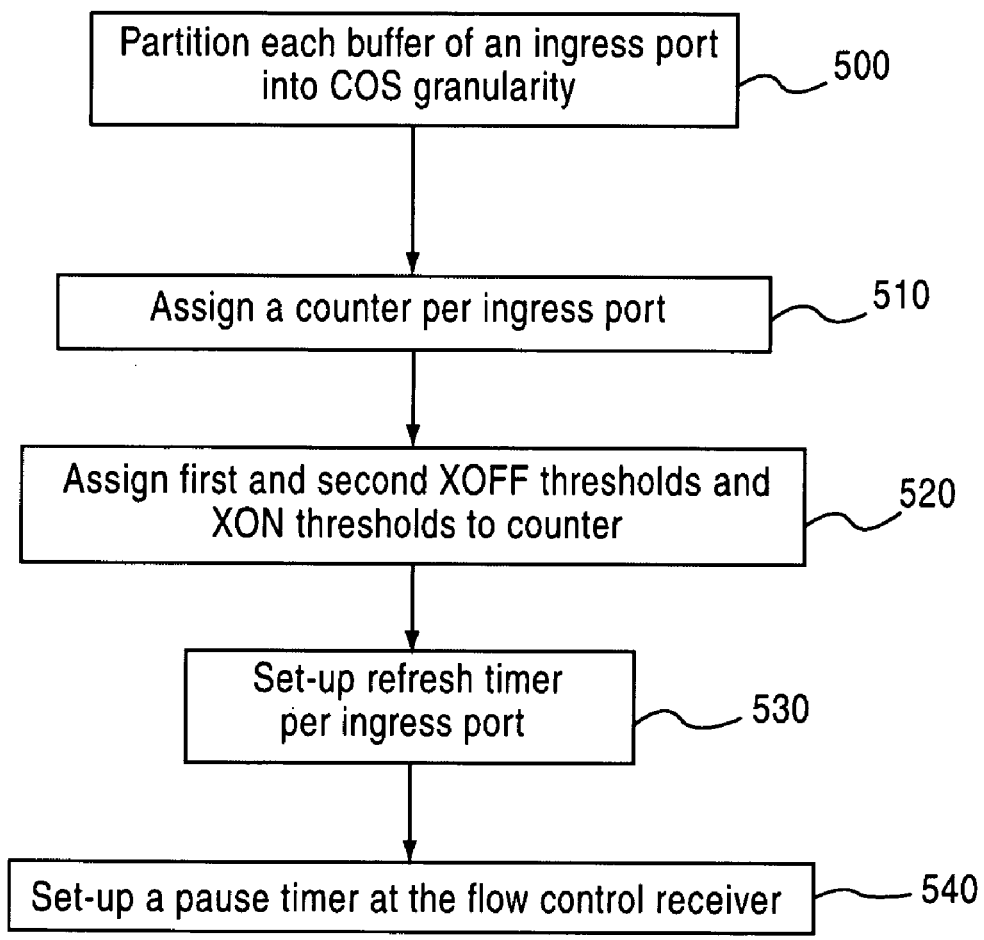
FIG. 6 illustrates a set-up method using two XOFF thresholds performed, in accordance with an embodiment of the present invention.

FIG. 6 illustrates a set-up method using at least two XOFF thresholds performed, in accordance with an embodiment of the present invention when a single ingress port counter 26 is implemented at the flow control sender. At operation 500, the method partitions, at the flow control sender 20, each buffer 24 of an ingress port into a single buffer pool for the ingress port as well as on a per COS granularity that is used to absorb the inflight frames that may arrive following the transmission of an XOFF SAFC message. At operation 510, the method assigns a counter 26 per ingress port and per ingress port per COS to track the corresponding buffer utilization. At operation 520, the method assigns first and second XOFF thresholds and first and second XON thresholds tied to the ingress port counter 26. At operation 530, the method sets-up a single refresh timer in the flow control sender 20. The refresh timer "refreshes" a current state of its flow control when in an XOFF state and a refresh time value expires.

At operation 540, the method sets-up a pause timer at the flow control receiver 22, which is set to a timeout value of an incoming XOFF message to support a determination that the XOFF state of congestion has terminated. Operations 500 to 540 are performed at the flow control sender side 20.

After operation 540, the method proceeds to operations 140 to 160 described above. Operations 140 to 160 performed at the flow control receiver side are the same when using two XOFF thresholds.

Figure 7A:
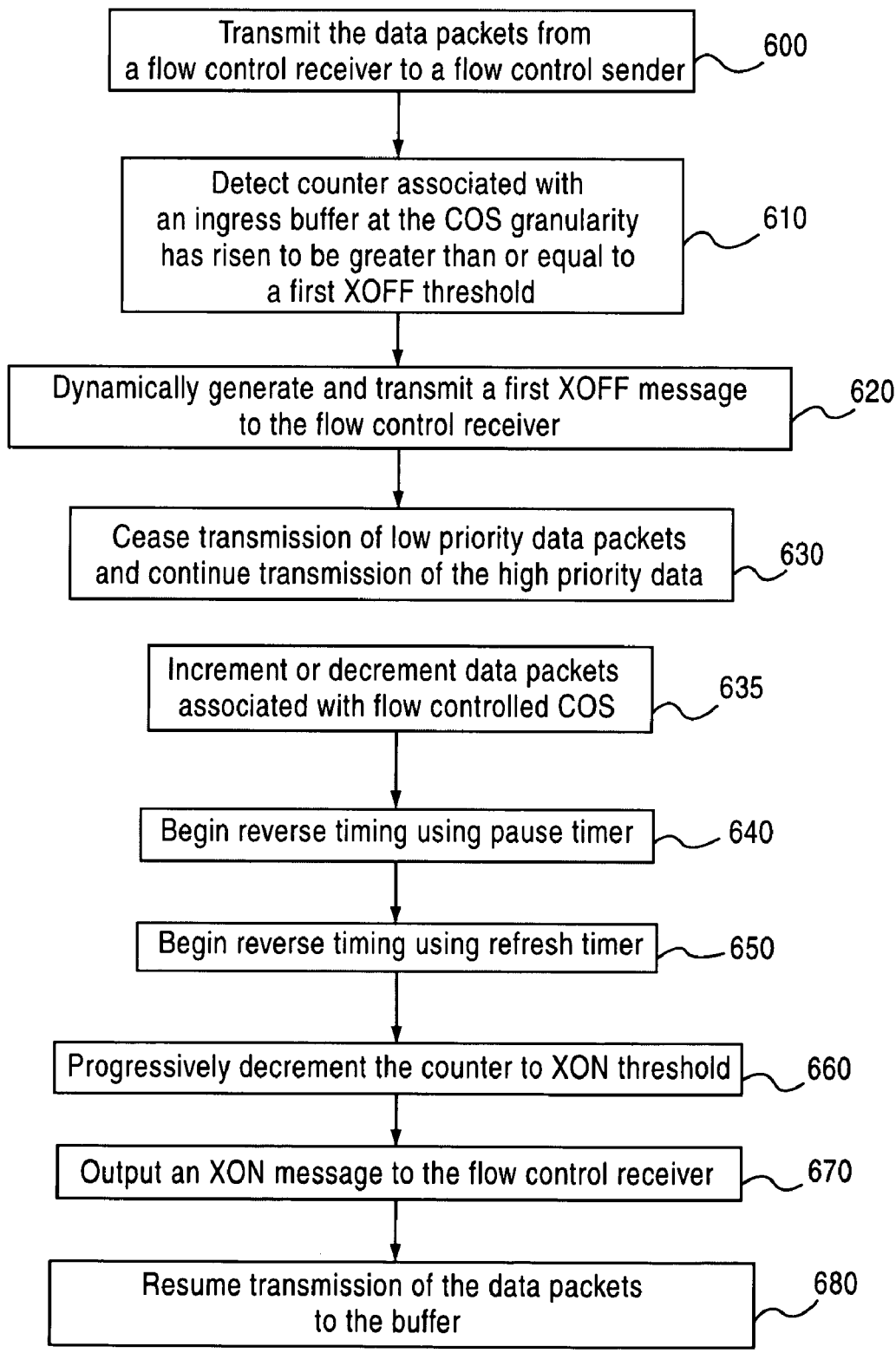

FIGS. 7A and 7B illustrate the SAFC method performed using the controller 30 in the flow control sender 20 using at least two XOFF thresholds, in accordance with an embodiment of the present invention. In FIG. 7A, at operation 600, the flow control receiver 22 transmits the data packets to the flow control sender 20. At operation 610, during transmission of the data packets between the flow control receiver 22 and the flow control sender 20, the method detects that the counter 26 associated with the buffer 24 of the ingress port at the ingress port granularity has risen to be greater than or equal to the first XOFF threshold, thereby dynamically indicating that the buffer 24 for the particular COS is operating at a first XOFF state. At operation 620, the method dynamically generates the first XOFF message associated with the particular ingress port experiencing congestion and transmits the first XOFF message to the flow control receiver 22. This SAFC message would contain the current flow control state for each of the COS or Class Groups in the form of a bitmap. At operation 630, the flow control receiver 22 ceases transmission of the best effort traffic or the low priority data packets to the buffer 24 for the particular COS experiencing congestion, but continues transmission of the high priority data. At operation 635, incrementing or decrementing data packets associated with the flow controlled COS that may still continue to arrive following the sending of the first XOFF message. While incrementing the counter 26, per COS inflight buffers associated with the ingress port experiencing congestion would be utilized to insure lossless frame delivery. At operation 640, the pause timer of the flow control receiver 22 begins reverse timing from the timeout value specified in the first XOFF message down to zero. At operation 650, the refresh timer begins reverse timing from the first refresh time value.

At operation 660, as a result of reducing the low priority data packet transmission, the method detects that congestion improves and, accordingly, the flow control sender 20 progressively decrements the counter 26 until the counter 26 reaches the XON threshold. At operation 670, if the counter 26 reaches the XON threshold, the flow control sender 20 outputs the XON message to the flow control receiver 22 indicative that the congestion detected at the ingress port per COS has been resolved. At operation 680, the flow control receiver 22 resumes transmission of the low priority data packets along with the high priority data packets to the buffer 24 for the particular COS.

As illustrated in FIG. 7B, at operation 700, if during the first XOFF state and transmission of the high priority data packets to the buffer 24 for the particular COS experiencing congestion, if the method detects that the ingress port buffer counter 26 has risen to be greater than or equal to the second XOFF threshold, indicative that the congestion has further reduced the buffer supply, the method would determine that the buffer 24 for the is operating at the second XOFF state. At operation 710, the controller 30 dynamically generates the second XOFF message associated with the higher COS now experiencing congestion and transmits the second XOFF message to the flow control receiver 22.

At operation 720, the flow control receiver 22 ceases transmission of all the data packets including the high priority data packets of the particular COS to the buffer 24 experiencing congestion. At operation 725, incrementing or decrementing data packets associated with the flow controlled COS that may still continue to arrive following the sending of the first XOFF message. While incrementing the counter 26, per COS buffers associated with the ingress port experiencing congestion would be utilized to insure lossless frame delivery. At operation 730, the pause timer of the flow control receiver 22 begins reverse timing from the timeout value specified in the second XOFF message down to zero. At operation 740, the refresh timer begins reverse timing from the second refresh time value.

If during the second XOFF state, the pause timer 36 at the flow control receiver 22 expires, at operation 750, the method determines that link errors may have caused the XON message to the flow control receiver 22 to become corrupted or lost. At operation 760, method directs the flow control receiver 22 to resume transmission of the data to the buffer 24. If the method determines that the buffer 24 associated with the ingress port at the ingress port granularity is still congested and that the counter 26 is at or above the second XOFF threshold, thereby operating at the second XOFF state, the method would return to operation 610, where the method would generate and transmit another XOFF message to the flow control receiver 22 that refreshes all of the flow control state for the COS available at the flow control sender.

Although operations 610 to 680 and 700 to 760 are described in sequential order, a person of ordinary skill in the art will appreciate that the operations may be performed in parallel. Further, although the refresh timers and the pause timers are described as reverse timers, a person of ordinary skill in the art will appreciate that regular incremental timers may be used to perform similar timing functions.

Figure 8:
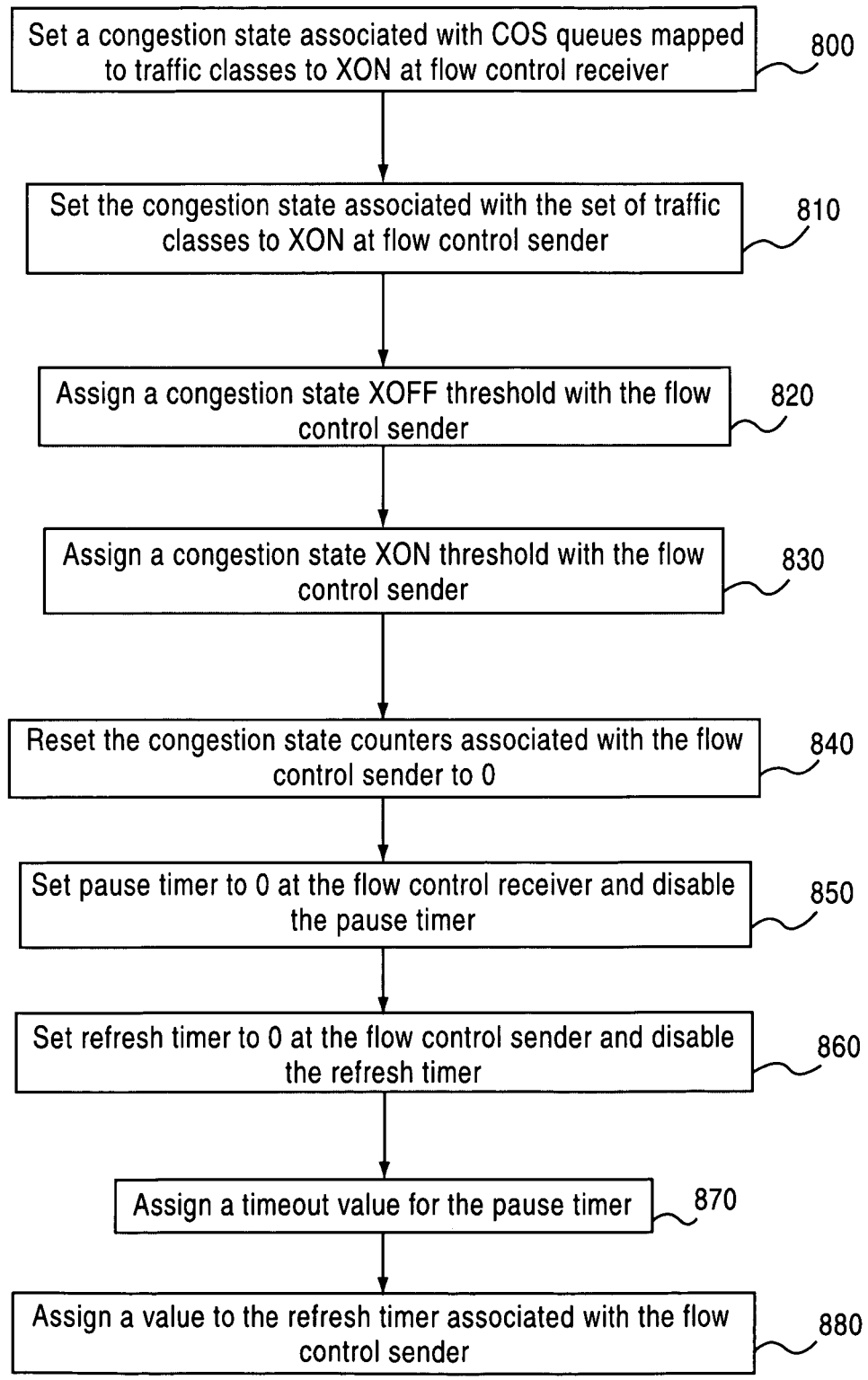
FIG. 8 illustrates an initialization method performed, in accordance with an embodiment of the present invention.

FIG. 8 illustrates an initialization method performed, in accordance with an embodiment of the present invention. At operation 800, a congestion state associated with COS queues mapped to traffic classes are set to XON at the flow control receiver 22. At operation 810, the congestion state associated with the set of traffic classes are set to the XON state at the flow control sender 20. At operation 820, the method assigns a congestion state XOFF threshold with at the flow control sender 20 to enable the flow control sender 20 to know when to transition a traffic class congestion state to the XOFF state. At operation 830, the method assigns a congestion state XON threshold with the flow control sender 20 to enable the flow control sender 20 to know when to transition a traffic class congestion state back to the XON state after being in the XOFF state.

At operation 840, the method resets the congestion state counter(s) 26 associated with the flow control sender 20. At operation 850, the method sets the pause timer 36 to zero at the flow control receiver 22 and disables the pause timer 36. At operation 860, the method sets the refresh timer 28 to zero at the flow control sender 20 and disables the refresh timer 28. At operation 870, the method assigns the timeout value to the pause timer 36 associated with the flow control receiver 22, which is to be included when the SAFC message (i.e., XOFF message) is transmitted to the flow control receiver 22 during the detection of the XOFF state. At operation 880, the method assigns a value to the refresh timer 28 associated with the flow control sender 20, which is to be used by the refresh timer 28 when needed.

Figure 9A:
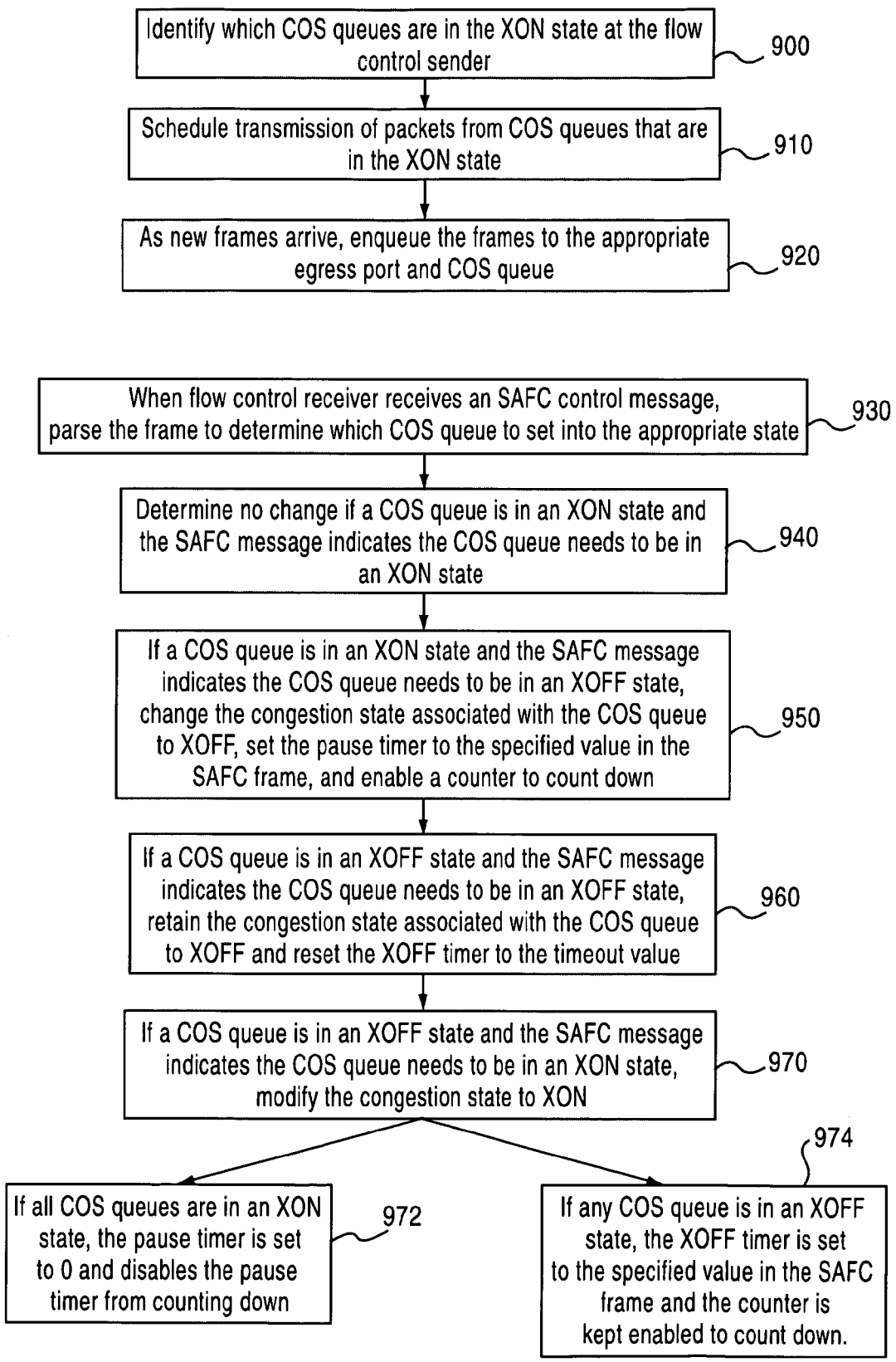
FIGS. 9A and 9B illustrate the SAFC method performed at the flow control receiver, in accordance with an embodiment of the present invention.
Figure 9B:
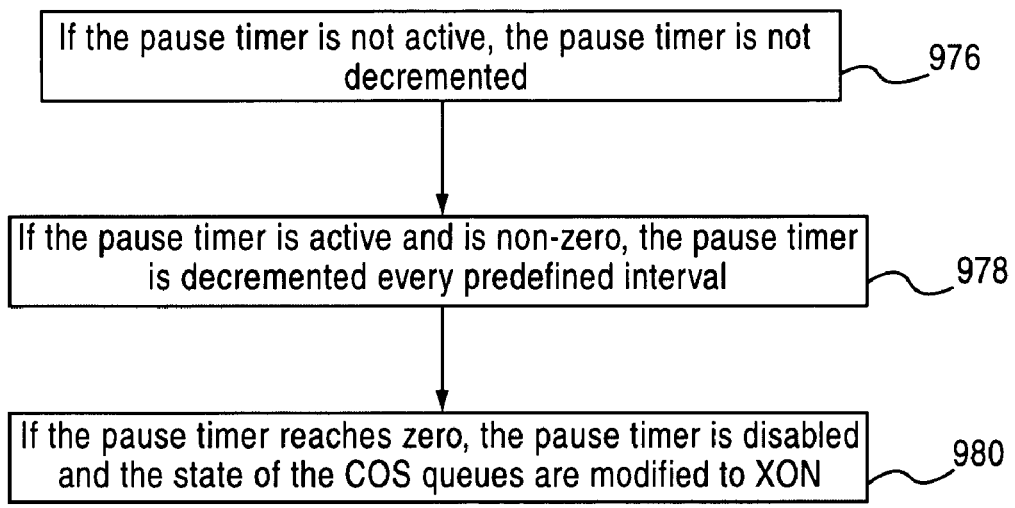

FIGS. 9A and 9B illustrate the SAFC method performed at a flow control receiver 22, in accordance with an embodiment of the present invention. At operation 900, the method continuously monitors the COS queues to identify which COS queues are in the XON state at the flow control receiver 22. At operation 910, the method schedules transmission of data packets from the COS queues that are in the XON state. At operation 920, as new frames arrive, the method enqueues the frames to the appropriate egress port and COS queue. At operation 930, the method determines that the flow control receiver has received the SAFC message, and, accordingly, parses the frame to determine which COS queue to set into the appropriate state (XON or XOFF). At operation 940, the method determines that if a COS queue is in the XON state and the SAFC message indicates the COS queue needs to be in an XON state, no changes occurs.

At operation 950, the method determines that if a COS queue is in an XON state and the SAFC message indicates the COS queue needs to be in an XOFF state, the method for the flow control sender 20 changes the congestion state associated with the COS queue to XOFF and sets the pause timer 36 to the specified value in the SAFC frame. The method also enables the refresh timer in the flow control sender 20 to count down as well as the pause timer in the flow control receiver to count down. At operation 960, if the COS queue is in an XOFF state and the SAFC message indicates the COS queue needs to be in an XOFF state, the flow control sender 20 retains the congestion state associated with the COS queue to XOFF and resets the pause timer 36 to the specified value, timeout value, in the SAFC frame. The counter 26 in the flow control sender 20 is kept enabled to countdown. At operation 970, if the COS queue is in the XOFF state and the SAFC message indicates the COS queue needs to be in an XON state, the method for the flow control sender 20 modifies the congestion state to the XON state. At operation 972, if all COS queues are in the XON state, the pause timer 36 is set to zero and disables the pause timer 36 from counting down. At operation 974, if any COS queue is in the XOFF state, the pause timer 36 is set to the specified value in the SAFC frame and the counter 36 is kept enabled to count down. As illustrated in FIG. 9B, at operation 976, if the pause timer 36 is not active, the pause timer 36 is not decremented. At operation 978, if the pause timer 36 is active and is non-zero, the pause timer 36 is decremented every predefined interval. At operation 980, if the pause timer 36 reaches zero, the pause timer 36 is disabled and the state of the COS queues are modified to XON.

FIG. 10 illustrates the SAFC method performed at a flow control sender 20, in accordance with an embodiment of the present invention. At operation 1000, as new frames arrive to the flow control sender, the method enqueues frames to the appropriate egress port and COS queue. At operation 1010, the method updates the counter(s) 26 that define the congestion state of the flow control sender associated with the flow control receiver 22. At operation 1020, after an update of the counter(s) 26, if a traffic class associated with counter 26 transitions from an XON state to an XOFF state, an SAFC message is generated with all of the current congestion states for all traffic classes associated with the flow control receiver 22. The XOFF timeout value is copied from the flow control sender 20 configuration and placed into the SAFC message. The SAFC message is then sent and the refresh timer 28 is reset to the configured value and enabled to count down. At operation 1030, after an update of the counter(s) 26, if a traffic class associated with counter 26 transitions from an XOFF state to an XON state, an SAFC message is generated with all of the current congestion state for all traffic classes associated with the flow control receiver 22.

At operation 1040, if any of the traffic classes are in an XOFF state, the timeout value is copied from the flow control sender 20 configuration and placed into the SAFC message. The message is sent and the refresh timer 28 is reset to a refresh value and enabled to count down. At operation 1050, if all of the traffic classes are in an XON state, the method sets the refresh timer 28 to zero and disables the refresh timer 28 from counting down. The SAFC message is then sent to the flow control receiver 22. At operation 1060, if the refresh timer 28 is not active, the refresh timer 28 is not decremented. At operation 1070, if the refresh timer 28 is active and is non-zero, the refresh timer 28 is decremented from a refresh value every predefined interval. At operation 1080, if the refresh timer 28 reaches zero, the SAFC message is generated, containing the current congestion state of all of the traffic classes and the configured timeout value. The refresh timer 28 is reset to the configured refresh value and enabled to count down.

Although only one refresh timer at the flow control sender and one pause timer at the flow control receiver is referred to above, a person of ordinary skill in the art will appreciate that multiple refresh timers may be used to individually control refreshing of flow control state for specific COS. To operate with multiple timers, the format of the SAFC message may follow the format that contains a variable number of field pairs that define the specific COS and the timeout value for that COS. The support of multiple timers enables finer grained control of the link error management mechanism that insures against lost XON's.

At the flow control sender if multiple refresh timers are supported, the user may individually configure each timer to control when to refresh the state only for the associated COS (or Class Group). When an individual refresh timer expires, an SAFC message is generated that contains a single field pair that specifies the COS to be affected and the configured timeout value associated with the XOFF action. When the flow control receiver receives this SAFC message, the flow control receiver will parse the message and take note of the COS to be affected by this XOFF flow control action and modifies the flow control state for the specified COS to be in an XOFF state thereby causing the scheduling to no longer choose that COS for packet transmissions. The flow control receiver also takes note of the timeout value and copies that into one of the multiple pause timers that is associated with the specified COS.

If an individual pause timer expires at the flow control receiver, the flow control receiver modfes the flow control state to be in an XON state and allows the scheduler to resume servicing that COS queue.

In view of the foregoing, the present invention enables high priority traffic to continue to flow while providing a PAUSE for low priority traffic, while also enabling the sharing of buffering resources across traffic classes so that they may be better leveraged to meet the demands of bursty traffic.

The present invention provides an option for loss-less operation for either an Ethernet network or any packet switched network, allowing high priority traffic to proceed while blocking low priority traffic in times of congestion, asserting flow control as infrequently as possible to maximize the bandwidth of the switch, allowing low-priority classes to be "oversubscribed" to allow for more buffer sharing and less frequent flow control, maintaining a non-blocking and a non-starving state as possible of "lower" class traffic by higher classes, and provides minimum guarantees to avoid starvation of lower classes and to also allow a minimum bandwidth for each port.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A service aware flow control apparatus for multiple classes of data packets, said apparatus comprising:
   a flow control sender comprising
      a buffer of an ingress port per Class Group or Class of Service (COS),
      a counter per COS, wherein each counter is configured to track an amount of buffer utilization per ingress port per COS, and each counter comprises an XOFF threshold level of congestion and an XON threshold,
      refresh timers per ingress port, the refresh timers being operatively connected to a controller and configured to time a refresh period in which the congestion at the only one buffer for the particular COS experiencing congestion is to be resolved, and
      the controller configured to detect, during transmission of the data packets, a counter associated with the buffer for the particular COS has risen to be greater than or equal to the XOFF threshold level of congestion, and to generate, upon expiration of one of the refresh timers, an XOFF message corresponding to only the one buffer for the particular COS for which the counter has risen to be greater than or equal to the XOFF threshold level of congestion, the XOFF message specifying the particular COS and a timeout value.

2. The service aware flow control apparatus as recited in claim 1, whereineachcounter is configured to incrementally count when a data packet is received at the buffer and decrement when the data packet is output from the buffer.

3. The service aware flow control apparatus as recited in claim 1, wherein the XOFF message defines an XOFF state of the buffer for the particular COS.

4. The service aware flow control apparatus as recited in claim 1, wherein the XOFF message includes a timeout value defining a time period for the flow control receiver to determine that the XOFF has expired.

5. The service aware flow control apparatus as recited in claim 1, wherein the flow control sender further comprises a refresh timer timing a refresh time period defined as a time in which the congestion at the buffer for the particular COS experiencing congestion is to be resolved, wherein the refresh timer is operatively connected to the controller.

6. The service aware flow control apparatus as recited in claim 1, wherein the controller is configured, upon detecting that the counter falls to less than the XON threshold, to output an XON message to a flow control receiver to resume transmission of the data packets to the buffer for the particular COS.

7. The service aware flow control apparatus of claim 1, further comprising a flow control receiver configured to cease transmission of the data packets to only the one buffer for the particular COS based on receiving the XOFF message.

8. The service aware flow control apparatus of claim 1, wherein the XOFF threshold level is different than the XON threshold.

9. The service aware flow control apparatus of claim 1, wherein the XOFF message is included in a SAFC message, the SAFC message including a bitmap indicating whether each class of service is included in an XON state or an XOFF state.

10. A service aware flow control method between a flow control sender and a flow control receiver for multiple classes of data packets, said method comprising:
    assigning a buffer of an ingress port per Class Group or Class of Service (COS);
    assigning a counter per COS to track buffer utilization;
    assigning an XOFF threshold level of congestion and an XON threshold to the counter per COS;
    during transmission of the data packets, detecting that a counter associated with a buffer for a particular COS has risen to be greater than or equal to the XOFF threshold level of congestion;
    timing a refresh period in which the congestion at the buffer for the particular COS is to be resolved; and
    generating an XOFF message upon expiration of the refresh time period, the XOFF message specifying the particular COS and a timeout value and corresponding to only the one buffer for the particular COS experiencing congestion from the flow control sender to the flow control receiver.

11. The service aware flow control method as recited in claim 10, further comprising ceasing transmission of the data packets upon receipt of the XOFF message by the flow control receiver.

12. The service aware flow control method as recited in claim 11, further comprising:
    upon receipt of the XOFF message, defining an XOFF state of the buffer for the particular COS experiencing congestion; and
    reverse timing from a timeout value specified in the XOFF message to zero.

13. The service aware flow control method as recited in claim 12, further comprising:
    reverse timing from a refresh time value to zero.

14. The service aware flow control method as recited in claim 13, further comprising:
    continuously outputting the data packets from the buffer for the particular COS experiencing congestion; and
    progressively decrementing the counter towards the XON threshold as the data packets are continuously output.

15. The service aware flow control method as recited in claim 14, wherein upon detecting that the counter falls to less than the XON threshold, further comprising:
    outputting an XON message from the flow control sender to the flow control receiver to resume transmission of the data packets to the buffer for the particular COS.

16. The service aware flow control method as recited in claim 10, further comprising:
    determining that the counter is at or above the XOFF threshold level of congestion; and
    generating another XOFF message corresponding to the buffer for the particular COS experiencing congestion from the flow control sender to the flow control receiver.

17. The service aware flow control method of claim 10, wherein the generating the XOFF message includes generating a SAFC message, the SAFC message including a bitmap with a bit corresponding to each COS, each bit indicating either an XOFF message or an XON message for the corresponding COS.

* * * * *

UNITED STATES PATENT AND TRADEMARK OFFICE
CERTIFICATE OF CORRECTION

PATENT NO. : 7,593,329 B2  
APPLICATION NO. : 11/260232  
DATED : September 22, 2009  
INVENTOR(S) : Bruce H. Kwan et al.

It is certified that error appears in the above-identified patent and that said Letters Patent is hereby corrected as shown below:

In column 14, line 42, please replace, "whereineachcounter", with --wherein each counter--

Signed and Sealed this

Third Day of November, 2009

David J. Kappos  
*Director of the United States Patent and Trademark Office*

UNITED STATES PATENT AND TRADEMARK OFFICE
CERTIFICATE OF CORRECTION

PATENT NO. : 7,593,329 B2
APPLICATION NO. : 11/260232
DATED : September 22, 2009
INVENTOR(S) : Kwan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 931 days.

Signed and Sealed this

Fourteenth Day of December, 2010

David J. Kappos
*Director of the United States Patent and Trademark Office*